(12) United States Patent
Ternisien

(10) Patent No.: US 10,647,814 B2
(45) Date of Patent: May 12, 2020

(54) PROCESS FOR PRODUCING AROMATIC POLYIMIDES

(71) Applicant: RHODIA OPERATIONS, Paris (FR)

(72) Inventor: Thomas Ternisien, Villeurbanne (FR)

(73) Assignee: RHODIA OPERATIONS, Paris (FR)

( * ) Notice: Subject to any disclaimer, the term of this patent is extended or adjusted under 35 U.S.C. 154(b) by 68 days.

(21) Appl. No.: 15/535,875

(22) PCT Filed: Dec. 17, 2015

(86) PCT No.: PCT/EP2015/080378
§ 371 (c)(1),
(2) Date: Jul. 10, 2017

(87) PCT Pub. No.: WO2016/097233
PCT Pub. Date: Jun. 23, 2016

(65) Prior Publication Data
US 2018/0346651 A1 Dec. 6, 2018

(30) Foreign Application Priority Data
Dec. 18, 2014 (EP) .................................... 14307091

(51) Int. Cl.
*C08G 73/10* (2006.01)
*C08G 69/26* (2006.01)

(52) U.S. Cl.
CPC ......... *C08G 73/1032* (2013.01); *C08G 69/26* (2013.01); *C08G 73/1028* (2013.01); *C08G 73/1082* (2013.01)

(58) Field of Classification Search
CPC ....................... C08G 73/1028; C08G 73/1032
See application file for complete search history.

(56) References Cited

U.S. PATENT DOCUMENTS

| | | | |
|---|---|---|---|
| 4,603,193 A * | 7/1986 | Richardson | ............ C08G 63/78 528/183 |
| 6,133,407 A | 10/2000 | Kaneshiro | |
| 2014/0342628 A1 * | 11/2014 | Jeol | .................... C08G 73/1007 442/181 |

FOREIGN PATENT DOCUMENTS

| FR | 2980202 A1 | 3/2013 |
|---|---|---|
| JP | H11333376 A | 12/1999 |
| JP | 2000297152 A | 10/2000 |
| JP | 2001098070 A | 4/2001 |
| JP | 2013256642 A | 12/2013 |

* cited by examiner

*Primary Examiner* — Gregory Listvoyb
(74) *Attorney, Agent, or Firm* — Thi Dang

(57) ABSTRACT

The invention relates to a process for producing an aromatic polyimide, comprising the following steps: (a) preparing one or more salt(s) by reacting one or more aromatic tetracarboxylic acid(s) in the solid state and one or more diamine(s), optionally in the presence of one or more chain limiter(s), in the presence of one or more binder(s), comprising one or more organic liquid(s), in an amount of from 1% to 25% by weight relative to the total weight of the aromatic tetracarboxylic acid(s), of the diamine(s) and of the optional chain limiter(s), then; (b) polymerising the salt(s) obtained in step (a).

16 Claims, No Drawings

PROCESS FOR PRODUCING AROMATIC POLYIMIDES

CROSS-REFERENCE TO RELATED APPLICATIONS

The present application is a U.S. national phase entry under 35 U.S.C. § 371 of International Application No. PCT/EP2015/080378, filed on 17 Dec. 2015, which claims priority to European Application No. 14307091.0, filed on 18 Dec. 2014. The entire content of each of these applications is explicitly incorporated herein by reference.

The present invention relates to aromatic thermoplastic polyimides and to the preparation thereof.

More precisely, the invention relates to a process for manufacturing aromatic thermoplastic polyimides by polymerization of one or more ammonium carboxylate salts formed starting with one or more aromatic tetracarboxylic acids and one or more diamines.

Polyimides, and especially aromatic polyimides, are known for their exceptional thermal and/or mechanical properties, which mark them out in particular for "high-performance" applications in various fields such as aeronautics or else electronics (printed circuit boards for example).

Nevertheless, these aromatic polyimides are considered to be thermosetting and infusible and require the use of synthesis processes in solution in solvents which are toxic, especially carcinogenic or potentially carcinogenic in some cases, and/or environmentally unfriendly, starting from aromatic diamines and aromatic dianhydrides. The best-known and most widespread process for synthesizing polyimides is a two-step process which involves a first step of reacting an aromatic dianhydride, in a solvent such as dimethylacetamide, cresols or else N-methylpyrrolidone, with an aromatic diamine, to form an intermediate known as a polyamic acid, which is subsequently converted to polyimide in a second step, by increasing the temperature or by chemical dehydration.

During the first step, the amines open the anhydride rings and give rise to an acid amide function, often called an amic acid function. The polyamic acid formed is soluble in the synthesis solvent and is converted by cyclization to polyimide, which is usually insoluble. To make a polyimide film, for example, a solution of poly(amic acid) is poured onto a heating surface. When the heating surface is heated, the solvent evaporates and cyclization takes place: a polyimide film is then obtained.

In order to render the aromatic polyimides fusible, and therefore amenable to conversion by techniques of extrusion or injection molding, in particular, it is known practice to use more flexible aromatic diamines, which give rise to amorphous polyimides with a glass transition temperature Tg of close to 200° C., which are known by the polyetherimide name, with Ultem being one commercial name. Processes have been developed which involve performing melt polymerization at between 275 and 290° C., as in U.S. Pat. No. 3,833,546, from a direct mixture of aromatic dianhydride and aromatic diamine or of aromatic tetracarboxylic acid and aromatic diamine. In this case, the control of the stoichiometry of the reagents is not optimal, and rapid degradation reactions take place. One drawback is that when the service temperature is greater than the glass transition temperature Tg of the polyimide, the polyimide loses its mechanical strength, owing to its amorphous nature. Lastly, as an amorphous polymer, the mechanical properties are dependent primarily on the molar mass, which must be greater than the molar mass between entanglements: for these polymers, this implies having appreciable molar masses, and this is accompanied by a high melt viscosity. These flexible aromatic polyimides are, in spite of this, considered to be thermoplastics.

Semiaromatic polyimides also represent an interesting approach, since they can be semicrystalline and can have melting points that are compatible with the conversion temperatures of thermoplastics, a melting point generally below 330° C., and can therefore be converted by the processing processes that are known for thermoplastics, similar to polyamides, while enjoying excellent heat resistance.

There are a variety of synthesis methods, starting with synthesis in solution as described for aromatic polyimides. One example of polyimide synthesis in solution is described by Cor Koning in the journal Polymer 1998, volume 39, 16, pages 3697-3702. The authors synthesize polyimides in solution from 3,3'-4,4'-biphenyltetracarboxylic dianhydride and from aliphatic diamines containing between 4 and 10 methylene groups. The polyimides obtained possess melting points below 330° C. Melt polymerizations are described in U.S. Pat. No. 2,710,853 or 2,867,609, from aliphatic diamine and pyromellitic anhydride, or from pyromellitic diacid anhydride diester derivatives, in accordance with known processes for polyamide synthesis. The major drawback of this technique is that it requires the selection of a synthesis temperature which is above the melting point of the polyimide formed, over long durations, thereby giving rise to substantial and significant thermal degradation.

To overcome this problem, a Japanese team (Inoue et al. in Macromolecules 1997, 30, 1921-1928 "High Pressure Synthesis of Aliphatic-Aromatic Polyimides via Nylon-Salt-Type Monomers derived from aliphatic diamines and pyromellitic acid and biphenyltetracarboxylic acid") identified a method for polymerizing an aromatic tetracarboxylic acid salt and aliphatic diamines in the solid state. The authors thus prepare a salt which is pressed at pressures of several hundred bar, to give objects such as disks, and subsequently heat the resulting disks to a given temperature under various pressures. In the course of the heating, the reaction takes place, and generates water, which shows that the reaction has taken place, and would take place very rapidly.

The problem with the processes envisaged by these authors lies in the fact that it is necessary to extract the water of reaction formed in the course of the forming operation, and this may give rise to defects in the parts, with long conversion times giving rise to excessive conversion costs and/or possibly producing parts of suboptimal quality, with problems of porosity and surface appearance, or else requiring adaptation and/or changing of equipment intended for the use of nonreactive polymers.

In addition, the existing processes may prove unsatisfactory in terms of controlling the structure, the molar mass and/or the viscosity of the polyimide. However, controlling these parameters is particularly important, in particular depending on the applications for which these polymers are intended.

In order to address these various problems, an improved process for obtaining semiaromatic and semicrystalline polyimide solid particles was described in patent application WO 2013/041 528. It is first a matter of reacting at least one diamine with at least one aromatic tetracarboxylic acid so as to obtain a salt. This first step may be performed in the presence of a chain limiter and/or of an excess of one of the monomers. A solid-state polymerization of the salt is then performed at a temperature above the glass transition temperature Tg of the polyimide to be obtained while at the same time remaining below the melting point of the salt obtained during the first step. The molar mass of the solid polyimide particles obtained is especially controlled by the amount of chain limiter and/or of excess of one of the monomers introduced during the first step.

The Applicant realised that this synthetic method was not entirely satisfactory and that it was possible to prepare aromatic and semicrystalline polyimides even more efficiently.

The object of the present invention is to propose a solution for, firstly, solving all of the problems mentioned above and, secondly, improving the existing processes especially in terms of yield and of control of the characteristics of the polyimides obtained.

The process for manufacturing an aromatic polyimide according to the invention comprises the following steps:

(a) preparation of one or more salts by reacting one or more aromatic tetracarboxylic acids in the solid state and one or more diamines, optionally in the presence of one or more chain limiters, in the presence of one or more binders, comprising one or more organic liquids, in an amount of from 1 to 25% by weight relative to the total weight of the aromatic tetracarboxylic acid(s), of the diamine(s) and of the optional chain limiter(s), and then;

(b) polymerization of the salt(s) obtained in step (a).

The process according to the invention allows the efficient and reliable industrial preparation of aromatic polyimides for various applications. The polyimides obtained are semicrystalline thermoplastics with the property of not releasing or absorbing water during subsequent conversion steps, for instance pultrusion, extrusion, or injection molding. They may especially be obtained in the form of powder with controlled particle sizes.

These powders may especially be used for producing composite articles, for producing articles by laser sintering, for coating, or in the cosmetic sector.

According to the invention, the use of a particular amount of binder during the preparation of the salt(s) makes it possible especially to increase the yield for the salification step (a). This amount of binder makes it possible to obtain, on conclusion of step (a), salts with a more homogeneous structure.

These effects make it possible firstly to increase the total yield for the polyimide synthesis process and secondly to obtain polymers whose structure is better controlled. In particular, the polymer chains are more homogeneous and the viscosity of the polymer is better controlled.

Thus, the process according to the invention allows particularly efficient control of the structure and of the viscosity of the polyimides obtained.

Another advantage of the process according to the invention is the capacity to perform the actual polymerization (step (b)) at a relatively low temperature, avoiding thermal degradation of the salt and of the polyimide formed.

According to a particularly advantageous embodiment of the invention, step (b) may be performed by simply increasing the temperature of the mixture obtained directly on conclusion of step (a), the water produced by the reaction having been removed beforehand. This makes it possible to perform the entire process in an integrated manner, especially in the same reactor, in the same mixer or in the same granulator.

Other advantages and characteristics of the invention will emerge more clearly on examining the detailed description below.

The term "binder" means any liquid compound which allows contacting of the aromatic tetracarboxylic acid(s) with the diamine(s) and the optional chain limiter(s), and which does not react chemically with the compounds described previously.

Advantageously, the binder makes it possible to dissolve at least a portion of one of the compounds from among the aromatic tetracarboxylic acid, the diamine and the chain limiter, preferably one of the compounds as mentioned above.

In particular, the binder makes it possible to dissolve the aromatic tetracarboxylic acid or the diamine or the optional chain limiter.

In a particularly preferred manner, the binder makes it possible to dissolve the aromatic tetracarboxylic acid, the diamine and the optional chain limiter.

The term "organic liquid" means any liquid organic compound which does not react chemically with the aromatic tetracarboxylic acid(s), the diamine(s) and the optional chain limiter(s).

These compounds are liquid at a temperature of 25° C. and at atmospheric pressure (760 mmHg).

The polyimide obtained via the process according to the invention is thermoplastic and semicrystalline. Preferably, it has a melting point Tf ranging from 50 to 350° C.

The melting point of the polyimide is preferably determined at the peak of the fusion endotherm as measured by differential scanning calorimetry (DSC), using a Perkin Elmer Pyris 1 machine, by heating the polyimide starting from 20° C. at a rate of 10° C./min.

The term "semicrystalline polyimide" means a polyimide having an amorphous phase and a crystalline phase, for example having a degree of crystallinity of between 1% and 85%.

The polyimides obtained via the process according to the present invention preferentially have a glass transition temperature Tg of less than or equal to 200° C., more preferentially less than or equal to 150° C.

The term "thermoplastic polyimide" means a polyimide having a temperature above which the material softens and melts, and below which it becomes hard.

The present invention relates to the manufacture of an aromatic polyimide from one or more aromatic tetracarboxylic acids and one or more diamines. The polymers obtained from only one diamine and only one tetracarboxylic acid are polyimides, which are generally known as homopolyimides. The reaction between at least three different monomers produces a polyimide, generally known as a copolyimide, most particularly two diamines and one tetracarboxylic acid or one diamine and two tetracarboxylic acids. The polyimides may be defined by the molar composition of each constituent monomer.

Step (a) according to the invention consists in preparing one or more salts by reacting one or more aromatic tetracarboxylic acids in the solid state and one or more diamines, optionally in the presence of one or more chain limiters.

According to the invention, step (a) is performed in the presence of one or more binders, comprising one or more organic liquids, in an amount of from 1 to 25% by weight relative to the total weight of the aromatic tetracarboxylic acid(s), of the diamine(s) and of the optional chain limiter(s). Preferably, the binder(s) are present in an amount ranging from 5 to 20% by weight, preferably from 10 to 20% by weight, relative to the total weight of the aromatic tetracarboxylic acid(s), of the diamine(s) and of the optional chain limiter(s).

According to a particular embodiment of the invention, the binder(s) comprise at least 50% by weight of organic liquid(s), preferably at least 60% by weight of organic liquid(s), more preferably 70% by weight of organic liquid(s), and particularly preferably 100% by weight of organic liquid(s) relative to the total weight of the binder.

In accordance with this embodiment, the binder may be a mixture based on organic liquid(s) and water in respective weight contents of (50/50), especially (60/40), preferably (70/30) and more preferentially 90/10.

Advantageously, the organic liquid(s) are chosen from $C_1$-$C_4$ and preferentially $C_1$-$C_3$ alcohols, ketones, and mixtures thereof. Preferentially, the organic liquid(s) are chosen from $C_1$-$C_3$ alcohols, especially ethanol.

According to a preferred embodiment, step (a) is performed in the presence of one or more organic liquids chosen from $C_1$-$C_3$ alcohols, especially ethanol, in a weight content ranging from 1 to 25% by weight relative to the total weight of the aromatic tetracarboxylic acid(s), of the diamine(s) and of the optional chain limiter(s).

Preferably, the salt(s) are prepared by reacting the aromatic tetracarboxylic acid(s) and the diamine(s) in a mole ratio of the aromatic tetracarboxylic acid(s) to the diamine(s) ranging from 0.70 to 1.30 and preferentially from 0.95 to 1.05. This means that the ratio between the amount in moles of aromatic tetracarboxylic acid(s), on the one hand, and the amount in moles of diamine(s), on the other hand, ranges from 0.70 to 1.30 and preferentially from 0.95 to 1.05.

The salt thus prepared is a salt in which the diamine and tetracarboxylic acid species are linked solely via polar interactions, in particular of the type —COO$^-$H$_3$$^+$N—, and not via covalent bonds. More particularly, the salt comprises an aromatic tetracarboxylic acid and a diamine, which are not covalently bonded together. In particular, the salt may have the following structure, with Ar representing an aromatic group:

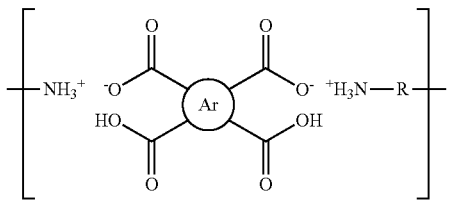

The aromatic tetracarboxylic acids of the process according to the invention preferentially have carboxylic acid functions in positions such that they enable, generally, the formation of two acid anhydride functions on the same molecule via a dehydration reaction. The aromatic tetracarboxylic acids of the present invention generally contain two pairs of carboxylic acid functions, each pair of functions being linked to an adjacent carbon atom, at α and β. The tetracarboxylic acid functions may be obtained from acid dianhydrides by hydrolysis of the anhydride functions. Examples of aromatic acid dianhydrides and of aromatic tetracarboxylic acids, derived from dianhydrides, are described in U.S. Pat. No. 7,932,012.

The aromatic tetracarboxylic acids of the invention may also bear functional groups, especially the group —SO$_3$X, where X=H or a cation, such as Na, Li, Zn, Ag, Ca, Al, K, and Mg.

Advantageously, the aromatic tetracarboxylic acids are chosen from pyromellitic acid, 3,3',4,4'-biphenyltetracarboxylic acid, 2,3,3',4'-biphenyltetracarboxylic acid, 2,2',3, 3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, and 2,2'-bis(3,4-bicarboxyphenyl) hexafluoropropanetetracarboxylic acid.

Preferably, the diamines of the invention are molecules of formula H$_2$N—R—NH$_2$ with a saturated or unsaturated, linear or branched aliphatic, cycloaliphatic or aromatic, divalent hydrocarbon-based radical R, optionally comprising one or more heteroatoms.

The radical R advantageously comprises from 2 to 50 carbon atoms, preferentially from 6 to 36 carbon atoms. The radical R may optionally contain one or more heteroatoms, such as O, N, P, or S. The radical R may comprise one or more functional groups, such as hydroxyl, sulfone, ketone, ether, or other functions.

Preferably, the amine functions are primary amines.

According to a first embodiment, the diamines of the invention are chosen from aliphatic diamines.

The diamines may in particular be diamines in positions α and ω, containing from 15 to 20 methylene groups.

Preferably, the aliphatic diamines are chosen from 1,2-diaminoethane, 1,3-diaminopropane, 1,4-diaminobutane, 1,5-diaminopentane, 2-methyl-1,5-diaminopentane, hexamethylenediamine, 3-methylhexamethylenediamine, 2,5-dimethylhexamethylenediamine, 2,2,4- and 2,4,4-trimethylhexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane, 1,13-diaminotridecane, and 1,14-diaminotetradecane.

According to a particular embodiment of the invention, the diamines are chosen from cycloaliphatic diamines, and preferably from isophorone diamine, 1,3-diaminocyclohexane, 1,4-diaminocyclohexane, diaminodicyclohexylmethane, 1,3-bis(aminomethyl)cyclohexane, 4,4'-methylenebis(cyclohexylamine) and 4,4'-methylenebis(2-methylcyclohexylamine).

Mention may be made of examples of diamines containing heteroatoms, such as polyether diamines, for instance the Jeffamine® and Elastamine® products sold by Huntsman. A variety of polyethers exist, composed of ethylene oxide, propylene oxide or tetramethylene oxide units.

According to a second embodiment, the diamines of the invention are chosen from aromatic diamines.

Preferably, the aromatic diamines are aromatic diamines comprising from 6 to 24 carbon atoms, more preferentially from 6 to 18 carbon atoms and even more preferentially from 6 to 10 carbon atoms, for instance m-xylylenediamine (MXDA).

Preferably, the aromaticity of the aromatic diamines results from the presence of the m-phenylene and/or o-phenylene groups, in a total number of said groups ranging from 1 to 2.

Advantageously, the aromatic diamines are chosen from m-phenylenediamine (MPD), p-phenylenediamine (PPD), 3,4'-diaminodiphenyl ether (3,4'-ODA), 4,4'-diaminodiphenyl ether (4,4'-ODA), m-xylylenediamine (MXDA), as illustrated below:

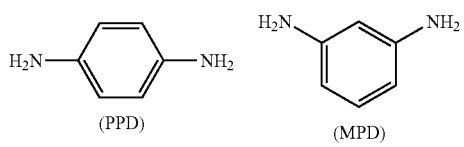

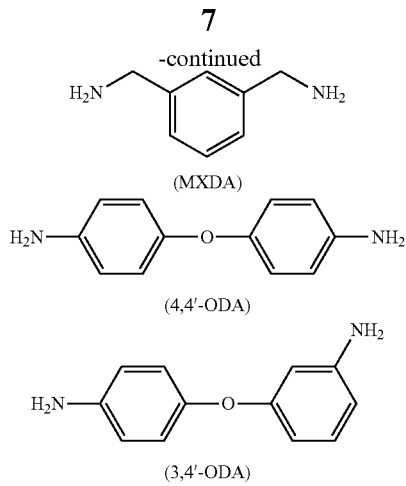

and p-xylylenediamine (PXDA, not shown).

An aromatic diamine that is particularly preferred is m-xylylenediamine (MXDA).

Step (a) may be performed in the presence of one or more chain limiters, which are compounds for controlling the chain lengths of the polyimide during the polymerization of the salt (step (b)).

Preferably, the chain limiter(s) are compounds (C) other than the aromatic tetracarboxylic acid(s) and the diamine(s), and which comprise one or more groups chosen from an amine group, a carboxylic acid group, an anhydride group, an ester group and an acyl chloride group.

According to one embodiment of the invention, the compound(s) (C) are chosen from monoamines, monoanhydrides, monoacids, diacids and aromatic dianhydrides.

The monoacids especially include acid monoesters as obtained by reacting an alcohol and an anhydride. The diacids especially include aromatic diacid diesters as obtained by reacting an alcohol and an aromatic dianhydride.

Preferably, the compounds (C) are chosen from 1-aminopentane, 1-aminohexane, 1-aminoheptane, 1-aminooctane, 1-aminononane, 1-aminodecane, 1-aminoundecane, 1-aminododecane, benzylamine, phthalic anhydride, pyromellitic anhydride, trimellitic anhydride, 1,2-benzenedicarboxylic acid, acetic acid, propionic acid, benzoic acid, stearic acid, mellitic acid, trimellitic acid, phthalic acid, hexan-1-oic acid, 1,2,3,4,5-benzenepentacarboxylic acid, trimellitic anhydride chloride and acid, ester and diester derivatives thereof, benzoyl chloride, toluoyl chloride, naphthoyl chloride, tetramethyl pyromellitate, tetraethyl pyromellitate, trimethyl 1,2,4-pyromellitate, trimethyl 1,2,5-pyromellitate, diethyl 1,2-pyromellitate, diethyl 1,4-pyromellitate, diethyl 1,5-pyromellitate, dimethyl 1,2-pyromellitate, dimethyl 1,4-pyromellitate, dimethyl 1,5-pyromellitate, methyl pyromellitate, ethyl pyromellitate, trimethyl trimellitate, triethyl trimellitate, dimethyl 1,3-trimellitate, dimethyl 1,4-trimellitate, diethyl 1,3-trimellitate, diethyl 1,4-trimellitate, diethyl 3,4-trimellitate, methyl trimellitate, ethyl trimellitate, isophthalic acid, terephthalic acid, succinic acid, glutaric acid, adipic acid, sebacic acid and 1,12-dodecanedioic acid, and mixtures thereof.

A compound (C) that is particularly preferred is 1-aminohexane.

The amount of optional compound (C) introduced is advantageously greater than 0.5% as number of moles relative to the total number of moles of aromatic tetracarboxylic acid and of diamine. Preferably, the amount of optional compound (C) introduced ranges from 0.5 to 10% as number of moles, more preferentially from 1 to 5% as number of moles, relative to the total number of moles of aromatic tetracarboxylic acid and of diamine.

During step (a), the binder(s) may especially be introduced either with the diamine(s) and/or with the chain limiter(s), or independently of the diamine(s) and/or of the optional chain limiter(s).

The process may be performed, for example, by adding to the aromatic tetracarboxylic acid(s) in solid form the diamine(s) and/or the optional chain limiter(s) in the form of a solution or dispersion thereof in the binder(s).

The process may be performed, for example, by spraying onto the aromatic tetracarboxylic acid in solid form a solution or a dispersion of the diamine(s) and/or of the chain limiter(s).

The binder(s) may also be added to the aromatic tetracarboxylic acid(s) in solid form, before the addition of the diamine(s) and/or of the optional chain limiter(s).

The process may thus be performed by spraying the binder(s) onto the aromatic tetracarboxylic acid(s) or onto the mixture of the aromatic tetracarboxylic acid(s) with the diamine(s), in the presence or absence of the chain limiter(s).

By way of example, ethanol is added to the aromatic tetracarboxylic acid which is in solid form. Next, the diamine in liquid form is added by spraying, and a chain limiter is added. The salt obtained precipitates out.

In all the possible cases as mentioned above, the reaction mixture is kept stirring.

During step (a), the temperature of the reaction medium is preferentially maintained at a temperature below 150° C.

At the end of this synthesis, the salt obtained on conclusion of step (a) may be dried, for example by drying at atmospheric pressure or by drying under vacuum, such that a dry powder is obtained. However, it is not essential to dry the salt obtained on conclusion of step (a), and said salt may be subjected directly to step (b) as outlined below. This is an additional advantage of the process according to the invention.

Implementation of step (a), as described above, makes it possible to obtain a very good yield for the actual salification reaction.

The salification yield may be determined by thermogravimetric analysis (TGA) by determining the amount of free monomers, i.e. the monomers which have not reacted to form the salt.

The yields obtained are especially of the order of 80% by weight, and preferentially greater than or equal to 95% by weight.

In addition, the salts obtained are of "equilibrated" structure, i.e. the molar amount of the aromatic tetracarboxylic acid(s) relative to the molar amount of the diamine(s) in the salt formed in step (a) is advantageously from 0.70 to 1.30 and preferentially from 0.95 to 1.05. The mole ratio is determined by potentiometry. This makes it possible to improve the structure and homogeneity of the polyimides obtained on conclusion of step (b).

In the context of the present invention, use may also be made of catalysts, added at any stage in the process, for instance by mixing with the diamine and/or the optional chain limiter, either individually or as a mixture to the salt formed.

During step (b) of the process according to the invention, polymerization of the salt(s) obtained in step (a) is performed to obtain the polyimide.

Preferably, the polymerization is performed in the solid state, in the melt, or in liquid medium, particularly preferably in the solid state.

The term "solid-state polymerization" is well known to those skilled in the art, and denotes a polymerization reaction in which the reaction medium remains in the solid state.

Solid-state polymerization in particular avoids the use of solvents, which may be harmful to the environment.

Preferably, step (b) is performed by solid-state polymerization, by bringing the mixture obtained directly on conclusion of step (a) to a temperature of greater than or equal to 150° C., preferably ranging from 150 to 250° C.

According to a preferred embodiment of the invention, the polymerization is performed at a temperature T that obeys the following relationship: Tf of the salt>T>Tg of the polyimide to be obtained.

The Tf of the salt obtained in step (a) denotes the melting point of said salt.

The melting point of the salt is preferentially determined by measuring the endotherm endpoint temperature as measured by differential scanning calorimetry (DSC), using a Perkin Elmer Pyris 1 machine, by heating the salt starting from 20° C. at a rate of 10° C./min.

Advantageously, the polymerization is performed at an absolute pressure ranging from 0.005 to 1 MPa and more preferentially ranging from 0.005 MPa to 0.2 MPa.

The solid-state polymerization process may be performed according to the conventional processes known to those skilled in the art. The fundamental principle of these processes consists in bringing the salt obtained in step (a) in the presence of the optional compound(s) (C), under air or under an inert atmosphere or under vacuum, to a temperature which is below the melting point of the salt but sufficient to allow the polymerization reaction, generally a temperature above the glass transition temperature of the polyimide. Such a process may thus comprise, in brief:

a) heating of the product by conductive or convective diffusion or by radiation;
b) inertizing by application of vacuum, flushing with a neutral gas such as nitrogen, $CO_2$, or superheated steam, or application of a positive pressure;
c) removal of the condensation by-product by evaporation, followed by flushing with the carrier gas or concentration of the gas phase;
d) mechanical stirring or fluidization of the solid phase with the carrier gas or vibration may be desirable in order to improve the heat and mass transfers and also to prevent any risk of agglomeration of the divided solid.

Preferentially, a means for keeping the polyimide in motion is used in the course of step (b) so as to obtain said polyimide in the form of particles, and to prevent aggregation of these particles. Mechanical stirring, such as by use of a stirrer, by rotation of the reactor, or by vibratory agitation, or by fluidization with a carrier gas, may be used to do this.

The polyimides obtained via the process according to the invention are advantageously in the form of particles whose median diameter D50 ranges from 0.01 to 2 mm.

The term "median diameter D50" means the median which separates the curve of particle size distribution by volume into two parts of equal areas. The particle size analyses may be performed using a Mastersizer X laser diffraction particle size analyzer having an extensive optical bench from Malvern Instruments S.A., making it possible to characterize particle sizes of between 2 and 2000 µm. As the distribution is by volume, the median diameter will correspond to 50% of the total volume of the particles. Furthermore, the given median diameter corresponds to the diameter of an equivalent sphere, it being assumed that all the objects have a shape equivalent to a sphere.

Preferably, the polyimides obtained via the process according to the invention are white. They especially have a CIE b* colorimetric characteristic of less than or equal to 10.

Preferably, the number-average molar mass $M_n$ of the polyimides according to the invention ranges from 500 to 50 000 g/mol, more preferentially from 2000 to 40 000 g/mol and even more preferentially from 5000 to 30 000 g/mol.

The specific molar masses in the present invention may be determined via many methods that are well known per se to those skilled in the art.

By way of illustration of these methods, mention may especially be made of that which is based on an analysis of the end groups, for example determination by NMR or titration, or that which calls upon a measurement using gel permeation chromatography (GPC), also known as size exclusion chromatography (SEC). In general, the choice of the solvent for performing the GPC measurements of a polyimide is made in a manner that is well known per se as a function of the structure of the polyimide.

Preferentially, to determine the concentrations of end groups, the NMR measurements of a polyimide may be taken in concentrated deuterated sulfuric acid as solvent.

The calculation of the mass distribution and also the average mass Mn may be performed in polystyrene equivalents (PST) or as absolute mass, after calibration using commercial standards. If necessary, absolute-weight measurements may be carried out by viscometric detection. In the context of the present invention, the average molar mass Mn is expressed as absolute mass. The average molar mass Mn may be calculated from the entire distribution or after truncation of the low masses if it is not desired to take into account the contribution of the cyclic oligomers.

At the end of step (b), the polyimide synthesized via the process according to the invention is recovered, preferably in the form of particles, and this may especially be done without additional mechanical milling being necessary. On the other hand, it may be useful to carry out deaggregation of particles which may be agglomerated.

The polyimide obtained via the process according to the invention may be used to prepare compositions that are generally obtained by mixing the polyimide with various compounds, especially fillers and/or additives. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed. According to particular embodiments, it is possible to prepare preblends, optionally in the melt state, before preparation of the final composition. It is possible, for example, to prepare a preblend in a resin, of the polyimide, for example, so as to produce a masterbatch.

A composition may be obtained by melt or nonmelt mixing of polyimides obtained via the manufacturing process as described previously, with reinforcing or bulking fillers and/or with impact modifiers and/or with additives.

Said composition may optionally comprise one or more other polymers.

Said composition may comprise between 20% and 90% by weight, preferentially between 20% and 70% by weight and more preferentially between 35% and 65% by weight of polyimide, according to the invention, relative to the total weight of the composition.

Said composition may also comprise reinforcing or bulking fillers. Reinforcing or bulking fillers are fillers conventionally used for the production of thermoplastic compositions, in particular based on polyamide. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, for instance dimethacrylate particles, glass beads or glass powder. Preferably, in particular, reinforcing fibers, such as glass fibers, are used.

Said composition may comprise between 5% and 60% by weight of reinforcing or bulking fillers and preferentially between 10% and 40% by weight, relative to the total weight of the composition.

Said composition, comprising the polyimide obtained via the process according to the invention as defined previously, may comprise at least one impact modifier, i.e. a compound that is capable of modifying the impact strength of a polyimide composition. These impact modifier compounds preferentially comprise functional groups that are reactive with the polyimide. The expression "functional groups that are reactive with the polyimide" means groups that are capable of reacting or of interacting chemically with the anhydride, acid or amine residual functions of the polyimide, in particular by covalency, ionic or hydrogen bond interaction or van der Waals bonding. Such reactive groups ensure effective dispersing of the impact modifiers in the polyimide matrix. Examples include anhydride, epoxide, ester, amine and carboxylic acid functions and carboxylate or sulfonate derivatives.

Said composition may also comprise additives generally used for the manufacture of polyimide or polyamide compositions. Thus, mention may be made of lubricants, flame retardants, plasticizers, nucleating agents, anti-UV agents, catalysts, antioxidants, antistatic agents, dyes, matting agents, molding aids or other conventional additives.

The fillers, impact modifiers and/or additives may be added to the polyimide via suitable usual means that are well known in the field of engineering plastics, for instance during salification or during polymerization.

The polyimide compositions are generally obtained by blending the various compounds included in the composition without heating or in the melt. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed.

It is possible to blend all the compounds in the melt phase during a single operation, for example during an extrusion operation. It is possible, for example, to blend granules or the polymer materials, to introduce them into the extrusion device in order to melt them and to subject them to more or less high shearing. According to specific embodiments, it is possible to preblend some of the compounds, in the melt or not in the melt, before preparation of the final composition.

The polyimide or the various compositions as defined previously may be used for any forming process for the manufacture of plastic articles.

Such plastic articles comprising the polyimide as manufactured by the process according to the invention may be manufactured. To this end, mention may be made of various techniques such as the molding process, especially injection molding, extrusion, extrusion blow-molding, or alternatively rotary molding, especially in the field of motor vehicles or of electronics and electricity, for example. The extrusion process may especially be a spinning process or a process for manufacturing films.

By virtue of its particularly good fluidity, the polyimide obtained via the process according to the invention is most particularly suitable for forming operations involving injection molding or melt extrusion.

Articles such as continuous-fiber composite articles or impregnated fabrics may be manufactured. These articles may especially be manufactured by contacting a fabric and polyimide particles obtained via the process according to the invention in the solid or melt state. Fabrics are textile surfaces obtained by assembling yarns or fibers which are rendered integral by any process, in particular such as adhesive bonding, felting, braiding, weaving or knitting. These fabrics are also referred to as fibrous or filamentous networks, for example based on glass fibers, carbon fibers or the like. Their structure may be random, unidirectional (1D) or multidirectional (2D, 2.5D, 3D or other).

The polyimides obtained via the process according to the invention may also be used in the form of particles in processes for manufacturing articles by selective melting of polymer powder layers, especially rapid prototyping by solid-phase laser sintering. Manufacture by selective melting of layers is a process for manufacturing articles that comprises laying down layers of materials in powder form, selectively melting a portion or a region of a layer, and laying down a new layer of powder, and again melting a portion of this layer, and so on, so as to give the desired object. The selectivity of the portion of the layer to be melted is obtained by means, for example, of the use of absorbers, inhibitors, or masks, or via the input of focused energy, for instance electromagnetic radiation such as a laser beam. Preference is given in particular to sintering by addition of layers, in particular to rapid prototyping by sintering using a laser.

Specific language is used in the description so as to facilitate understanding of the principle of the invention. Nevertheless, it should be understood that no limitation of the scope of the invention is envisaged by the use of this specific language. Modifications, improvements and refinements may in particular be envisaged by a person conversant with the technical field concerned on the basis of his own general knowledge.

The term "and/or" includes the meanings and, or, and all the other possible combinations of the elements connected to this term.

Other details or advantages of the invention will become more clearly apparent in the light of the examples given below purely by way of indication.

EXAMPLES

Measuring Protocols

Thermogravimetric analyses (TGA) were performed to determine the degree of conversion of the monomers during the preparation of the salts. The machine used is a Perkin-Elmer TGA-7. The salt samples are heated from 30° C. to 800° C. at a rate of 10° C. per minute and the loss of mass recorded. The loss of mass detected between 160° C. and 300° C. corresponds to the loss of water generated by the polycondensation reaction. The ratio between the latter and the maximum theoretical loss of mass that would be observed in the case of total conversion makes it possible to evaluate the conversion of the salt and thus the amount of unreacted monomers.

The mole ratio of the dry salt is determined by pH-metric titration using a Mettler-Toledo T50 machine. The titration is performed on a volume of 40 mL of water containing about 0.5 g of dry salt to which are added 10 mL of sodium hydroxide at a concentration of 1 mol/L. The titrating solution used is a hydrochloric acid solution at 1 mol/L. Titration of the sodium hydroxide residue characterized by the first equivalent volume (V1) affords access to the amount of pyromellitic acid (PMA) by back-titration. The difference of the equivalent volumes (V2-V1) makes it possible to measure the amount of 2-methyl-1,5-diaminopentane by direct titration. The titration is performed on three samples. The mole ratio of the salt is thus defined by the mole ratio between the number of moles of tetra-acid and the number of moles of diamine.

Differential scanning calorimetry (DSC) analyses are performed to determine the melting point and crystallization point of the polyimides synthesized. The machine used is a Perkin-Elmer Pyris 1. The samples are subjected to a first temperature increase from 20° C. to 380° C., which temperature is below the degradation temperature of the polyimide, and then to cooling to 20° C. and finally to a second increase up to 380° C. at a rate of 10° C./minute. The endothermic and exothermic phenomena are recorded during these sequences. The melting points and crystallization points are determined at the top of the respective characteristic peaks.

Example 1 (According to the Invention): Preparation of an MPMD/PMA Salt by Spraying of a Liquid Solution of Diamine onto the Solid Tetra-Acid with 10% of Ethanol as Binder 25.02 g (0.1 mol) of pyromellitic acid (PMA) are placed in a 500 ml reactor of rotary drum type stirred by a rotational motion along an axis with a slope of greater than 20° relative to the horizontal axis. The reactor is equipped with counter-paddles so as to improve the mixing by mechanical stresses. An ethanolic solution of 2-methyl-1,5-diaminopentane (MPMD) is prepared by mixing 11.46 g (0.1 mol) of the diamine with 4.06 g of ethanol (Hexalab, purity >99.8%) to reach a mass titer of 26%. Thus, when all of the diamine solution is injected onto the acid, the mass titer of ethanol is 10% in the reaction mixture.

The 2-methyl-1,5-diaminopentane/ethanol solution is added into the reaction medium by means of a volumetric metering pump over 3 hours. The amount of liquid injected is monitored by weighing the mass of the feed solution. The liquid diamine/ethanol solution is introduced onto the solid tetra-acid in the form of a spray produced using a flat-cone injection nozzle positioned inside the reactor. Throughout the injection, the reactor is maintained at a temperature of 30° C., with stirring at 30 rpm and under an inert atmosphere by flushing with a stream of nitrogen.

After drying under vacuum at 300 mbar at a temperature of 70° C. for 2 hours, the salt formed is in the form of a white powder of homogeneous particle size.

The degree of conversion is evaluated by thermogravimetric analysis. Thus, the synthesized salt is heated to 800° C. at a heating rate of 10° C./minute. The loss of mass recorded by TGA between 160° C. and 300° C. and associated with the loss of water resulting from the polycondensation reaction is 18.9 m %, which corresponds to a degree of conversion of the salt into polyimide of greater than 95%.

The synthesized salt has an equilibrated mole ratio of 1.04.

Example 2 (Comparative): Preparation of an MPMD/PMA Salt by Spraying of a Liquid Solution of Diamine onto the Solid Tetra-Acid in the Absence of Binder 25.02 g (0.1 mol) of pyromellitic acid (PMA) are placed in a 500 ml reactor of rotary drum type stirred by a rotational motion along an axis with a slope of greater than 20° relative to the horizontal axis. The reactor is equipped with counter-paddles so as to improve the mixing by mechanical stresses. 11.47 g (0.1 mol) of liquid 2-methyl-1,5-diaminopentane (MPMD) are added to the reaction medium by means of a volumetric metering pump over 2 hours 30 minutes. The amount of diamine injected is monitored by weighing the mass of the solution. The liquid diamine is introduced onto the solid tetra-acid in the form of a spray produced using a flat-cone injection nozzle positioned inside the reactor. Throughout the injection, the reactor is maintained at a temperature of 30° C., with stirring at 30 rpm and under an inert atmosphere by flushing with a stream of nitrogen.

After drying under vacuum at 300 mbar at a temperature of 70° C. for 2 hours, the salt formed is in the form of a white powder containing agglomerates.

In order to evaluate the conversion, the synthesized salt is heated to 800° C. at a heating rate of 10° C./minute. The loss of mass recorded by TGA between 160° C. and 300° C. and associated with the loss of water resulting from the polycondensation reaction is then 22.6 m %, which value is greater than the maximum theoretical loss value, which is 19.4 m %. The difference is explained by the fact that this loss of mass corresponds to evaporation of the water originating from the polycondensation reaction, to which must be added the sublimation of the excess tetra-acid which was not removed during the drying.

The synthesized salt has a mole ratio of 1.2, which confirms the excess of tetra-acid.

Finally, the degree of conversion of the salt into polyimide is less than 85% under these conditions.

Example 3 (According to the Invention): Preparation of the Polyimide PI MPMD/PMA in Solid Phase at 210° C.

1.64 g of the salt MPMD/PMA prepared in example 1 are brought to a temperature of 210° C. in a tube equipped with a mechanical stirrer and maintained under a controlled atmosphere of nitrogen throughout the reaction. After 4 hours of reaction, a polyimide in solid block form is obtained.

A melting point of 339° C. and a crystallization point of 273° C. are observed on evaluation of the thermal properties of the polyimide by DSC.

Example 4 (Comparative): Preparation of the Polyimide PI MPMD/PMA in Solid Phase at 210° C.

1.53 g of the salt MPMD/PMA prepared in example 2 are brought to a temperature of 210° C. in a tube equipped with a mechanical stirrer and maintained under a controlled atmosphere of nitrogen throughout the reaction. After 5 hours of reaction, a polyimide in solid block form is obtained.

A melting point of 329° C. and a crystallization point of 224° C. are observed on evaluation of the thermal properties of the polyimide by DSC.

The invention claimed is:

1. A process for manufacturing an aromatic polyimide, characterized in that it comprises the following steps:
   (a) preparation of one or more salts by reacting one or more aromatic tetracarboxylic acids in the solid state and one or more diamines, in the presence of one or more binders in an amount of from 1% to 25% by weight relative to the total weight of the aromatic tetracarboxylic acid(s) and the diamine(s), wherein the one or more binders is/are selected from organic liquids which do not react chemically with the aromatic tetracarboxylic acid(s) and the diamine(s); and then
   (b) polymerization of the salt(s) obtained in step (a).

2. The process as claimed in claim 1, characterized in that the binder(s) is/are present in an amount ranging from 5 to 20% by weight, relative to the total weight of the aromatic tetracarboxylic acid(s) and the diamine(s).

3. The process as claimed in claim 1, characterized in that the organic liquids are chosen from $C_1$-$C_4$ alcohols, ketones, and mixtures thereof.

4. The process as claimed in claim 1, characterized in that, during step (a), the binder(s) are introduced either with the diamine(s) or independently of the diamine(s).

5. The process as claimed in claim 1, characterized in that the polymerization is performed during step (b) in the solid state, in the melt, or in liquid medium.

6. The process as claimed in claim 1, characterized in that the salt(s) are prepared by reacting the aromatic tetracarboxylic acid(s) and the diamine(s) in a mole ratio of the aromatic tetracarboxylic acid(s) to the diamine(s) ranging from 0.70 to 1.30 and preferentially from 0.95 to 1.05.

7. The process as claimed in claim 1, characterized in that said aromatic tetracarboxylic acid(s) are chosen from pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, and 2,2'-bis(3,4-bicarboxyphenyl) hexafluoropropanetetracarboxylic acid.

8. The process as claimed in claim 1, characterized in that the diamine(s) are molecules of formula $H_2N-R-NH_2$ with a linear or branched, saturated or unsaturated aliphatic, cycloaliphatic or aromatic divalent hydrocarbon-based radical R, optionally comprising one or more heteroatoms.

9. The process as claimed in claim 8, characterized in that the radical R comprises from 2 to 50 carbon atoms, and optionally one or more heteroatoms.

10. The process as claimed in claim 1, characterized in that the diamine(s) are aliphatic diamines selected from 1,2-diaminoethane, 1,3-diaminopropane, 1,4-diaminobutane, 1,5-diaminopentane, 2-methyl-1,5-diaminopentane, hexamethylenediamine, 3-methylhexamethylenediamine, 2,5-dimethylhexamethylenediamine, 2,2,4- and 2,4,4-trimethylhexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane, 1,13-diaminotridecane, and 1,14-diaminotetradecane.

11. The process as claimed in claim 1, characterized in that the diamine(s) are cycloaliphatic diamines selected from isophorone diamine, 1,3-diaminocyclohexane, 1,4-diaminocyclohexane, diaminodicyclohexylmethane, 1,3-bis(aminomethyl)cyclohexane, 4,4'-methylenebis(cyclohexylamine) and 4,4'-methylenebis(2-methylcyclohexylamine).

12. The process as claimed in claim 1, characterized in that the diamine(s) are aromatic diamines selected from m-phenylenediamine, p-phenylenediamine, 3,4'-diaminodiphenyl ether, 4,4'-diaminodiphenyl ether, m-xylylenediamine and p-xylylenediamine.

13. The process as claimed in claim 1, characterized in that said chain limiter(s) are compounds (C) comprising one or more groups chosen from an amine group, a carboxylic acid group, an anhydride group, an ester group and an acyl chloride group.

14. The process as claimed in claim 13, characterized in that the compounds (C) are chosen from 1-aminopentane, 1-aminohexane, 1-aminoheptane, 1-aminooctane, 1-aminononane, 1-aminodecane, 1-aminoundecane, 1-aminododecane, benzylamine, phthalic anhydride, pyromellitic anhydride, trimellitic anhydride, 1,2-benzenedicarboxylic acid, acetic acid, propionic acid, benzoic acid, stearic acid, mellitic acid, trimellitic acid, phthalic acid, hexan-1-oic acid, 1,2,3,4,5-benzenepentacarboxylic acid, trimellitic anhydride chloride and acid, ester and diester derivatives thereof, benzoyl chloride, toluoyl chloride, naphthoyl chloride, tetramethyl pyromellitate, tetraethyl pyromellitate, trimethyl 1,2,4-pyromellitate, trimethyl 1,2,5-pyromellitate, diethyl 1,2-pyromellitate, diethyl 1,4-pyromellitate, diethyl 1,5-pyromellitate, dimethyl 1,2-pyromellitate, dimethyl 1,4-pyromellitate, dimethyl 1,5-pyromellitate, methyl pyromellitate, ethyl pyromellitate, trimethyl trimellitate, triethyl trimellitate, dimethyl 1,3-trimellitate, dimethyl 1,4-trimellitate, diethyl 1,3-trimellitate, diethyl 1,4-trimellitate, diethyl 3,4-trimellitate, methyl trimellitate, ethyl trimellitate, isophthalic acid, terephthalic acid, succinic acid, glutaric acid, adipic acid, sebacic acid and 1,12-dodecanedioic acid, and mixtures thereof.

15. The process as claimed in claim 1, characterized in that step (b) is performed by solid-state polymerization, by bringing the mixture obtained directly on conclusion of step (a) to a temperature of greater than or equal to 150° C., and in that, during step (b), the polymerization is performed at an absolute pressure ranging from 0.005 to 1 MPa.

16. The process as claimed in claim 1, wherein the preparation of one or more salts at step (a) is carried out in the presence of one or more chain limiters, and the binder(s) is/are present in an amount of from 1% to 25% by weight relative to the total weight of the aromatic tetracarboxylic acid(s), the diamine(s) and the chain limiter(s).

* * * * *